United States Patent
Jun et al.

(10) Patent No.: US 10,506,233 B2
(45) Date of Patent: Dec. 10, 2019

(54) ENCODER FOR DETERMINING QUANTIZATION PARAMETER ADAPTIVELY AND APPLICATION PROCESSOR HAVING THE SAME

(71) Applicant: Samsung Electronics Co., Ltd., Suwon-si, Gyeonggi-do (KR)

(72) Inventors: Sung Ho Jun, Suwon-si (KR); Sung Jei Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 100 days.

(21) Appl. No.: 15/283,750

(22) Filed: Oct. 3, 2016

(65) Prior Publication Data
US 2017/0099487 A1 Apr. 6, 2017

(30) Foreign Application Priority Data
Oct. 5, 2015 (KR) .................. 10-2015-0139917

(51) Int. Cl.
| H04N 19/124 | (2014.01) |
| H04N 19/136 | (2014.01) |
| H04N 19/167 | (2014.01) |
| H04N 19/176 | (2014.01) |
| H04N 19/146 | (2014.01) |

(52) U.S. Cl.
CPC ......... *H04N 19/124* (2014.11); *H04N 19/136* (2014.11); *H04N 19/146* (2014.11); *H04N 19/167* (2014.11); *H04N 19/176* (2014.11)

(58) Field of Classification Search
CPC .. H04N 19/124; H04N 19/136; H04N 19/146; H04N 19/167; H04N 19/176
USPC .................................................. 375/240.03
See application file for complete search history.

(56) References Cited

U.S. PATENT DOCUMENTS

| 5,374,958 | A | 12/1994 | Yanagihara |
| 5,561,719 | A | 10/1996 | Sugahara et al. |
| 5,686,962 | A | 11/1997 | Chung et al. |
| 6,463,100 | B1 | 10/2002 | Cho et al. |
| 7,539,246 | B2 | 5/2009 | Morisada et al. |
| 7,933,459 | B2 | 4/2011 | Sato et al. |
| 8,204,105 | B2 | 6/2012 | Hasegawa et al. |
| 8,411,741 | B2 | 4/2013 | Sugiyama et al. |
| 8,588,309 | B2 | 11/2013 | Doepke |
| 8,625,924 | B2 | 1/2014 | Tanaka et al. |
| 2009/0016631 | A1 * | 1/2009 | Naito ............... H04N 19/176 382/251 |

(Continued)

FOREIGN PATENT DOCUMENTS

JP 6-22292 1/1994

*Primary Examiner* — Ayman A Abaza
(74) *Attorney, Agent, or Firm* — Harness, Dickey & Pierce, P.L.C.

(57) ABSTRACT

An encoder comprises a rate controller and a quantizer. The rate controller may be configured to compare an activity of a current block with an average activity of a previous frame; determine a quantization parameter offset according to the comparison between the activity of the current block and the average activity of the previous frame. Lastly, the rate controller may be configured to determine a quantization parameter using the quantization parameter offset. The quantizer in the encoder may be configured to quantize the current block using the quantization parameter.

18 Claims, 12 Drawing Sheets

(56) References Cited

U.S. PATENT DOCUMENTS

| | | | |
|---|---|---|---|
| 2012/0183053 A1* | 7/2012 | Lu ........................ | H04N 19/176 |
| | | | 375/240.03 |
| 2013/0077871 A1* | 3/2013 | Lu ........................... | G06K 9/36 |
| | | | 382/197 |
| 2015/0016510 A1* | 1/2015 | Carlsson ................ | H04N 19/15 |
| | | | 375/240.03 |

* cited by examiner

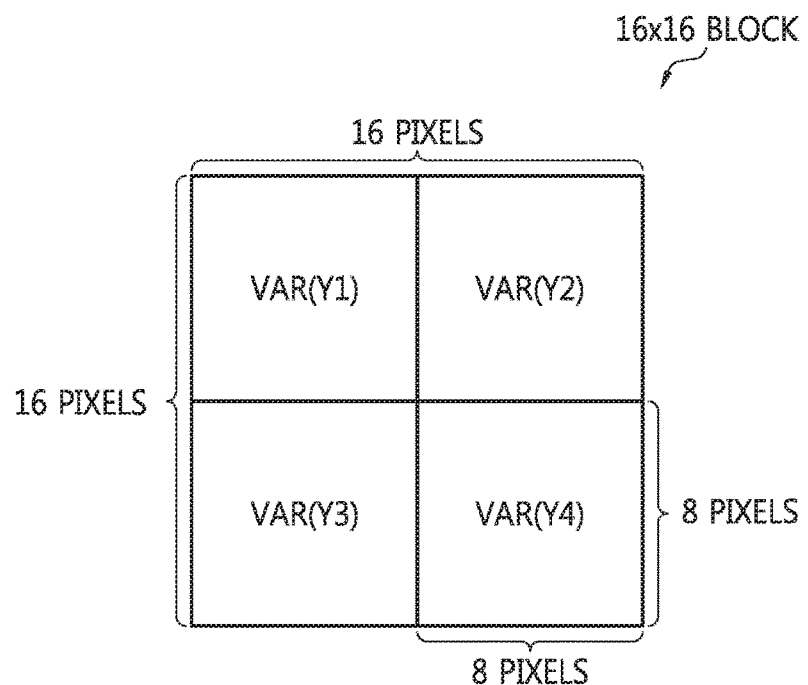

FIG. 6
IMT= 3, LMT = 0
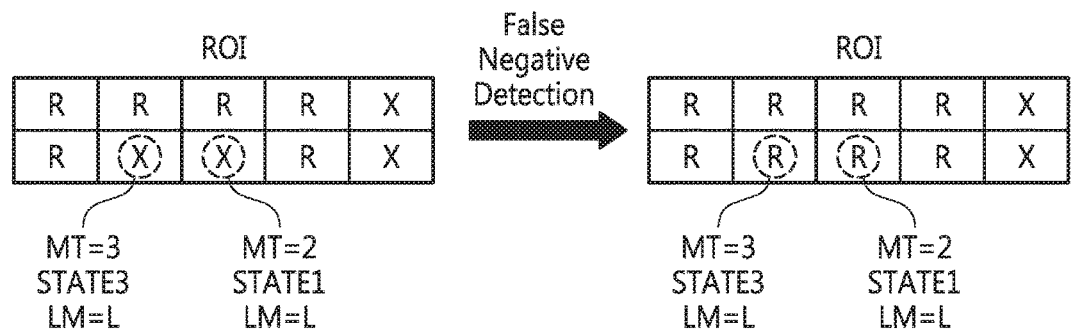
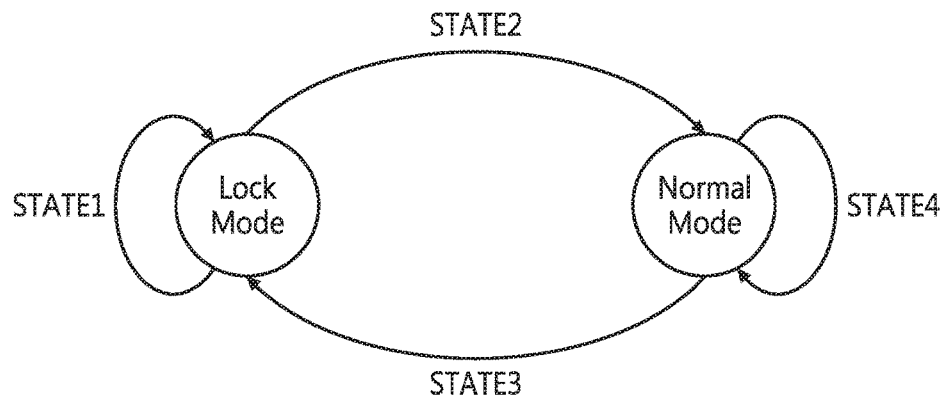

ACTPA = 100, Strength = 3, QPMIN = 1, QPMAX = 51, IMT= 3, LMT = 0

FIG. 7A

QPREF

| 30 | 30 | 30 | 30 |
|----|----|----|----|
| 30 | 30 | 30 | 30 |
| 30 | 30 | 30 | 30 |
| 30 | 30 | 30 | 30 |

FIG. 7B

ACT

| 80  | 33  | 100 | 103 |
|-----|-----|-----|-----|
| 50  | 40  | 30  | 30  |
| 101 | 30  | 800 | 750 |
| 100 | 102 | 600 | 700 |

→ Acivity Masking →

FIG. 7C

QPOFF

| 0  | -2 | 0   | 0   |
|----|----|-----|-----|
| -1 | -2 | -2  | -2  |
| 0  | -2 | (5) | (5) — QPOFF(3,4) |
| 0  | 0  | (4) | (4) — QPOFF(4,4) |

QPOFF(3,3)   QPOFF(4,3)

ACTPA = 100, Strength = 3, QPMIN = 1, QPMAX = 51, IMT= 3, LMT = 0

FIG. 8A

ROI

| X | R | X | X |
|---|---|---|---|
| R | R | R | R |
| X | R | (X) | (X) |
| X | X | X | X |

ROI(3,3), ROI(3,4)

→ False Negative Detection →

FIG. 8B

False Negative Detection

| R | R | X | X |
|---|---|---|---|
| R | R | R | R |
| X | R | (R) | (R) |
| X | X | X | X |

ROI(3,3), ROI(3,4)

FIG. 8C

QPREF+QPOFF

| 30 | 28 | 30 | 30 |
|----|----|----|----|
| 29 | 28 | 28 | 28 |
| 30 | 28 | (35) | (35) |
| 30 | 30 | 34 | 34 |

QPREF(3,3)+QPOFF(3,3), QPREF(3,4)+QPOFF(3,4)

→ False Negative Detection →

| 30 | 28 | 30 | 30 |
|----|----|----|----|
| 29 | 28 | 28 | 28 |
| 30 | 28 | (28) | (28) |
| 30 | 30 | 34 | 34 |

QP(3,3), QP(3,4)

ACTPA = 200, Strength = 6, QPMIN = 1, QPMAX = 51, IMT= 3, LMT = 0

FIG. 9A

QPREF

| 30 | 30 | 30 | 30 |
|---|---|---|---|
| 30 | 30 | 30 | 30 |
| 30 | 30 | 30 | 30 |
| 30 | 30 | 30 | 30 |

FIG. 9B

ACT

| 30 | 33 | 100 | 30 |
|---|---|---|---|
| 50 | 40 | 80 | 30 |
| 101 | 103 | 800 | 750 |
| 100 | 102 | 600 | 700 |

Acivity Masking →

FIG. 9C

QPOFF

| -9 | -9 | -3 | -9 |
|---|---|---|---|
| -6 | -7 | -4 | -9 |
| -2 | -2 | (6) | (6) |
| -3 | -2 | (5) | (6) |

— QPOFF(3,4)
— QPOFF(4,4)

QPOFF(3,3)  QPOFF(4,3)

ACTPA = 100, Strength = 3, QPMIN = 1, QPMAX = 51, IMT= 3, LMT = 0

FIG. 10A

ROI

| R | R | R | R |
|---|---|---|---|
| R | R | R | R |
| R | R | (X) | (X) — ROI(3,4) |
| R | R | (X) | (X) — ROI(4,4) |

ROI(3,3)   ROI(4,3)

False Negative Detection →

FIG. 10B

False Negative Detection

| R | R | R | R |
|---|---|---|---|
| R | R | R | R |
| R | R | (R) | (R) — ROI(3,4) |
| R | R | (R) | (R) — ROI(4,4) |

ROI(3,3)   ROI(4,3)

FIG. 10C

QPREF+QPOFF

| 21 | 21 | 27 | 21 |
|---|---|---|---|
| 24 | 23 | 26 | 21 |
| 28 | 28 | (36) | (36) — QPREF(3,4)+QPOFF(3,4) |
| 27 | 28 | (35) | (36) — QPREF(4,4)+QPOFF(4,4) |

QPREF(3,3)+QPOFF(3,3)   QPREF(4,3)+QPOFF(4,3)

False Negative Detection →

| 21 | 21 | 27 | 21 |
|---|---|---|---|
| 24 | 23 | 26 | 21 |
| 28 | 28 | (28) | (28) — QP(3,4) |
| 27 | 28 | (28) | (28) — QP(4,4) |

QP(3,3)   QP(4,3)

ENCODER FOR DETERMINING QUANTIZATION PARAMETER ADAPTIVELY AND APPLICATION PROCESSOR HAVING THE SAME

CROSS-REFERENCE TO RELATED APPLICATION

This application claims priority under 35 U.S.C. § 119 from Korean Patent Application No. 10-2015-0139917 filed in the Korean Intellectual Property Office (KIPO) on Oct. 5, 2015, the disclosure of which is hereby incorporated by reference in its entirety.

BACKGROUND

1. Field

Example embodiments of inventive concepts relate to encoders, such as encoders for adaptively determining a quantization parameter, and application processors having the same. A data communication in a mobile environment goes through a process of quantizing data to be transmitted to efficiently use limited data.

2. Description of Related Art

Quantization means dividing input data into a finite number of levels to represent the input data by a small bit number, and giving unique value to the input data at each level. Blocks included in a frame may have different images to show, such that when quantizing each of the blocks, a different quantization parameter for characteristics of each of the blocks is set.

SUMMARY

Example embodiment of inventive concepts are directed towards an encoder, comprising a rate controller configured to determine a quantization parameter offset based on an activity of a current block and an average activity of a previous fame, and determine a quantization parameter using the quantization parameter offset, and a quantizer configured to quantize the current block using the quantization parameter. The quantization parameter is a quantization parameter of the current block.

Example embodiment of inventive concepts are directed towards an application processor, comprising an image signal processor configured to output a previous frame and a current frame, a quantizer an encoder configured to be connected to the image signal processor, wherein the encoder including a rate controller. The rate controller may be configured to determine a quantization parameter offset based on an activity of a current block and an average activity of a previous frame, and determine a quantization parameter using the quantization parameter offset. The quantizer may be configured to quantize a block using the quantization parameter.

Example embodiments of inventive concepts are directed towards an encoder including, a rate controller configured to output a quantization parameter based on a quantization parameter offset and lock mode information, the quantization parameter offset based on (i) an activity signal of a current block, (ii) an average activity of a previous frame, and (iii) a strength signal corresponding to the average activity of the previous frame, and the lock mode information being one of a locked state and a normal state, the locked state corresponding to a region of interest information of neighboring blocks of the current block if the region of interest information represents a region of interest, the normal state corresponding to the region of interest information of any one of the neighboring blocks of the current block if the region of interest information represents region of non-interest.

BRIEF DESCRIPTION OF THE DRAWINGS

The foregoing and/or other aspects and advantages of inventive concepts will become apparent and more readily appreciated from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 3 represents a block and sub-blocks included in the block;

FIG. 4 is a table representing strength corresponding to the average activity of a previous frame;

FIG. 6 represents whether or not a block in a lock mode is changed according to conditions;

FIGS. 7A to 7C represent steps of determining a quantization parameter of a plurality of blocks according to example embodiments of inventive concepts;

FIGS. 8A to 8D represent steps of determining the quantization parameter of the plurality of blocks according to example embodiments of inventive concepts;

FIGS. 9A to 9C represent steps of determining the quantization parameter of the plurality of blocks according to example embodiments of inventive concepts;

FIGS. 10A to 10D represent steps of determining the quantization parameter of the plurality of blocks according to example embodiments of inventive concepts;

DETAILED DESCRIPTION OF THE EMBODIMENTS

Figure 1:
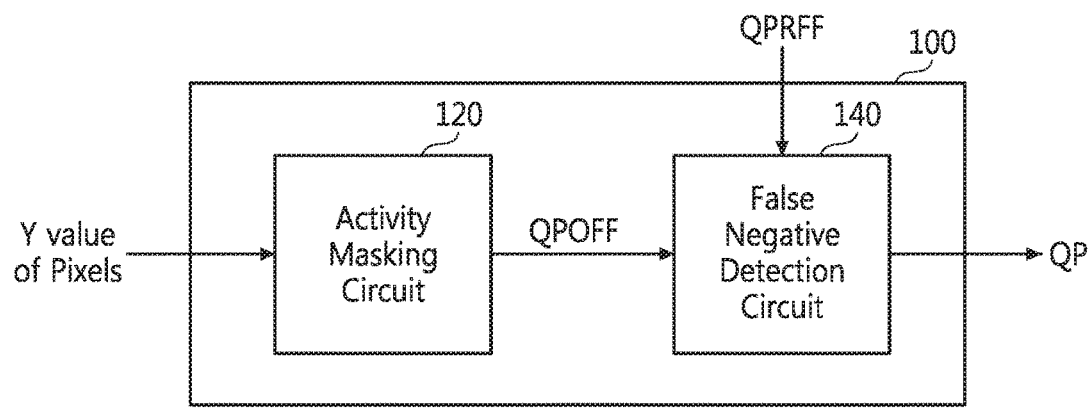
FIG. 1 is a block diagram of a rate controller according to an example embodiment of inventive concepts.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may not be repeated.

A macroblock may refer to a unit, which composes at least a part of a frame in image processing. The macroblock may include a plurality of pixels. The macroblock may include a plurality of sub-blocks. A block herein may refer to the macroblock.

A current block herein may refer to a macroblock on which current image processing is performed. According to example embodiments, the number of sub-blocks included in the macroblock may be changed, and the number of pixels included in the macroblock may also be changed. In addition, a current frame herein may refer to a frame including the current block, and a previous frame may refer to a frame in which image processing is performed before or immediately before the current frame is image-processed.

It is assumed that a macroblock may include 16×16 pixels, that is, 16 horizontal pixels and 16 vertical pixels. Each of sub-blocks included in the macroblock includes 8×8 pixels, that is, 8 horizontal pixels and 8 vertical pixels.

For the purposes of convenience of description, a block may be expressed by a matrix. That is, a $(i,j)^{th}$ block $B(i,j)$ herein may refer to a block positioned in an $i^{th}$ row and a $j^{th}$ column among a plurality of blocks. The expression manner as described above is used not only to represent a block itself but also to represent the following characteristics of the block: (i) a $(i,j)^{th}$ quantization parameter offset $QPOFF(i,j)$ of the block, (ii) a $(i,j)^{th}$ region of interest $ROI(i,j)$ of the block, (iii) a $(i,j)^{th}$ activity $ACT(i,j)$ of the block, (iv) a $(i,j)^{th}$ reference quantization parameter $QPREF(i,j)$ of the block, (iv) a $(i,j)^{th}$ lock mode $LM(i,j)$ of the block, and (v) a $(i,j)^{th}$ quantization parameter $QP(i,j)$ of the block. Here, i and j are natural numbers and i may or may not be equal to j.

Neighboring blocks of a current block herein may refer to a block on a left side of the current block, a block on a upper side of the current block, a block on a upper left side of the current block, and a block on a upper right side of the current block.

For example, when a current block is the $(i,j)^{th}$ block $B(i,j)$, neighboring blocks of the current block may be a $(i-1,j-1)^{th}$ block $B(i-1,j-1)$, a $(i-1,j)^{th}$ block $B(i-1,j)$, a $(i-1,j+1)^{th}$ block $B(i-1,j+1)$, and a $(i,j-1)^{th}$ block $B(i,j-1)$.

According to example embodiments, some of blocks included in the neighboring blocks may not be present. For example, when a current block is positioned at the far most right side of a frame, a block on the upper right side among the neighboring blocks may not be present.

FIG. 1 is a block diagram of a rate controller according to example embodiments of inventive concepts.

Referring to FIG. 1, a rate controller 100 may include at least an activity masking circuit 120 and a false negative detection circuit 140.

The activity masking circuit 120 may receive a brightness value Y of each of pixels included in a block, and further determine a quantization parameter offset QPOFF using the received brightness value Y.

The false negative detection circuit 140 may receive the quantization parameter offset QPOFF and a reference quantization parameter QPREF, and determine a quantization parameter QP of a current block using the quantization parameter offset QPOFF and the reference quantization parameter QPREF.

Figure 2:
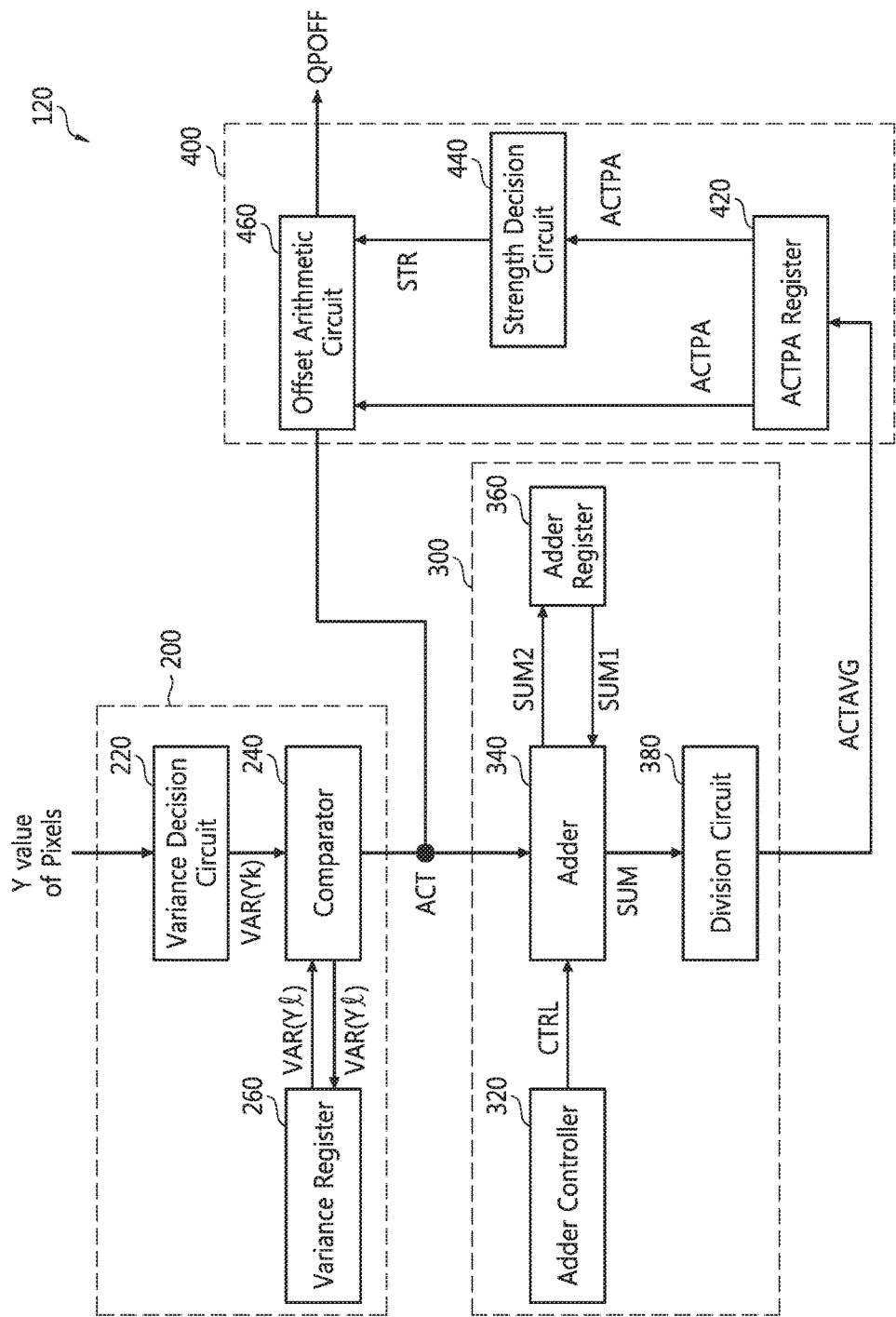
FIG. 2 is a block diagram of an activity masking circuit shown in FIG. 1 according to an example embodiment.

FIG. 2 is a block diagram of the activity masking circuit 120 shown in FIG. 1, FIG. 3 represents a block and sub-blocks included in the block, and FIG. 4 is a table representing strength corresponding to an average activity of a previous frame.

Referring to FIG. 2, the activity masking circuit 120 may include at least an activity decision circuit 200, an activity average decision circuit 300, and an offset decision circuit 400. The activity decision circuit 200 may include at least a variance decision circuit 220, a comparator 240, and a variance register 260.

Referring to FIGS. 2 and 3, it is assumed that a current block includes four sub-blocks. The variance decision circuit 220 may receive brightness values of pixels included in four sub-blocks SUB1, SUB2, SUB3, and SUB4.

The variance decision circuit 220 may calculate a first variance value VAR(Y1) of brightness values of pixels included in a first sub-block SUB1, calculate a second variance value VAR(Y2) of brightness values of pixels included in a second sub-block SUB32, calculate a third variance value VAR(Y3) of brightness values of pixels included in a third sub-block SUB3, and calculate a fourth variance value VAR(Y4) of brightness values of pixels included in a fourth sub-block SUB4.

The variance decision circuit 220 may sequentially transmit each result VAR(Yk) of the calculations to the comparator 240, where k is a natural number less than or equal to 4.

The comparator 240 may receive each result VAR(Yk) of the calculations from the variance decision circuit 220, and read a variance value VAR(Yl) stored in the variance register 260, where l is a natural number less than or equal to 4. The comparator 240 may determine the smallest value among the variance value VAR(Yl) stored in the variance register 260, and thereafter store the determined variance value in the variance register 260.

For example, when a first variance value VAR(Y1) is received by the comparator 240, the comparator 240 may store the first variance value VAR(Y1) in the variance register 260 as VAR (Yl). When a second variance value VAR(Y2) is received by the comparator 240, the comparator 240 may read the first variance value VAR(Y1) from the variance register 260, compare the second variance value VAR(Y2) with the first variance value VAR(Y1), and store the smaller of the second variance value VAR(Y2) and the first variance value VAR(Y1) in the variance register 260 as VAR (Yl). A comparison operation for respective variance values VAR(Y3) and VAR(Y4) is the same, equivalent or similar to the comparison operation of the second variance value VAR(Y2).

The comparator 240 may output an activity ACT corresponding to a determined variance value after a comparison operation for the sub-blocks SUB1 to SUB4 included in a current block is completed.

The variance register 260 may store a variance value VAR(Ym) that is transmitted from the comparator 240, where m is one of natural numbers from 1 to 4.

An activity average decision circuit 300 may include at least an adder controller 320, an adder 340, an adder register 360, and a division circuit 380.

The adder controller 320 may transmit a control signal CTRL to the adder 340. The adder controller 320 may control whether the adder 340 reads a value stored in the adder register 360 or outputs a result value SLUM to the division circuit 380.

The adder 340 may read a value SUM1 stored in the adder register 360, add an activity ACT and the stored value SUM1, and store an added value SUM2 in the adder register 360 according to a control of the adder controller 320. In addition, the adder 340 may output a result value SUM of an addition to the division circuit 380 according to a control of the adder controller 320. The adder register 360 may store the added value SUM2 transmitted by the adder 340.

The division circuit 380 may receive the result value SUM of an addition from the adder 340, and output an average activity ACTAVG to an average activity register 420. The average activity ACTAVG may be obtained by dividing the result value SUM by the number of blocks included in the current frame.

The offset decision circuit 400 may include the average activity register 420, a strength decision circuit 440, and an offset arithmetic circuit 460. The average activity register 420 may receive the average activity ACTAVG output from the division circuit 380, and store the average activity ACTAVG.

The strength decision circuit 440 may receive an average activity ACTPA of a previous frame outputted from the average activity register 420, and determine the strength corresponding to the average activity ACTPA of the previous frame.

Referring to FIGS. 2 and 4, according to example embodiments, when the average activity ACTPA of the previous frame is less than or equal to 50, the strength STR may be one. When the average activity ACTPA of the previous frame is greater than 50 and less than or equal to 80, the strength STR may be two. When the average activity ACTPA of the previous frame is greater than 80 and less than or equal to 110, the strength STR may be three. When the average activity ACTPA of the previous frame is greater than 110 and less than or equal to 150, the strength STR may be four.

Still referring to FIGS. 2 and 4, when the average activity ACTPA of the previous frame is greater than 150 and less than or equal to 190, the strength STR may be five. When the average activity ACTPA of the previous frame is greater than 190 and less than or equal to 230, the strength STR may be six. When the average activity ACTPA of the previous frame is greater than 230 and less than or equal to 270, the strength STR may be seven. When the average activity ACTPA of the previous frame is greater than 270, the strength STR may be eight; however, a relationship between the average activity ACTPA and the strength STR is not limited to example embodiments shown in FIG. 4. That is, the strength STR corresponding to the average activity ACTPA of the previous frame may be changed according to example embodiments of inventive concepts.

The offset arithmetic circuit 460 may receive an activity ACT from the activity decision circuit 200, receive the activity ACTPA of the previous frame from the activity register 420, and receive the strength STR from the strength decision circuit 440.

The offset arithmetic circuit 460 may determine a quantization parameter (QP) offset QPOFF according to Equation 1 when the activity ACT is greater than or equal to the activity ACTPA of the previous frame.

$$QPOFF = \left(\frac{4*ACT + ACTPA}{ACT + 4*ACTPA} - 1\right)*STR \quad \text{[Equation 1]}$$

Here, QPOFF represents a quantization parameter offset, ACT represents an activity of a current block, ACTPA represents an average activity of a previous frame, and STR represents strength.

The offset arithmetic circuit 460 may determine a quantization parameter offset QPOFF according to Equation 2 when the activity ACT is less than or equal to the activity ACTPA of a previous frame.

$$QPOFF = \left(1 - \frac{ACT + 4*ACTPA}{4*ACT + ACTPA}\right)*STR \quad \text{[Equation 2]}$$

Here, QPOFF represents a quantization parameter offset, ACT represents an activity of a current block, ACTPA represents an average activity of a previous frame, and STR represents strength.

Figure 5:
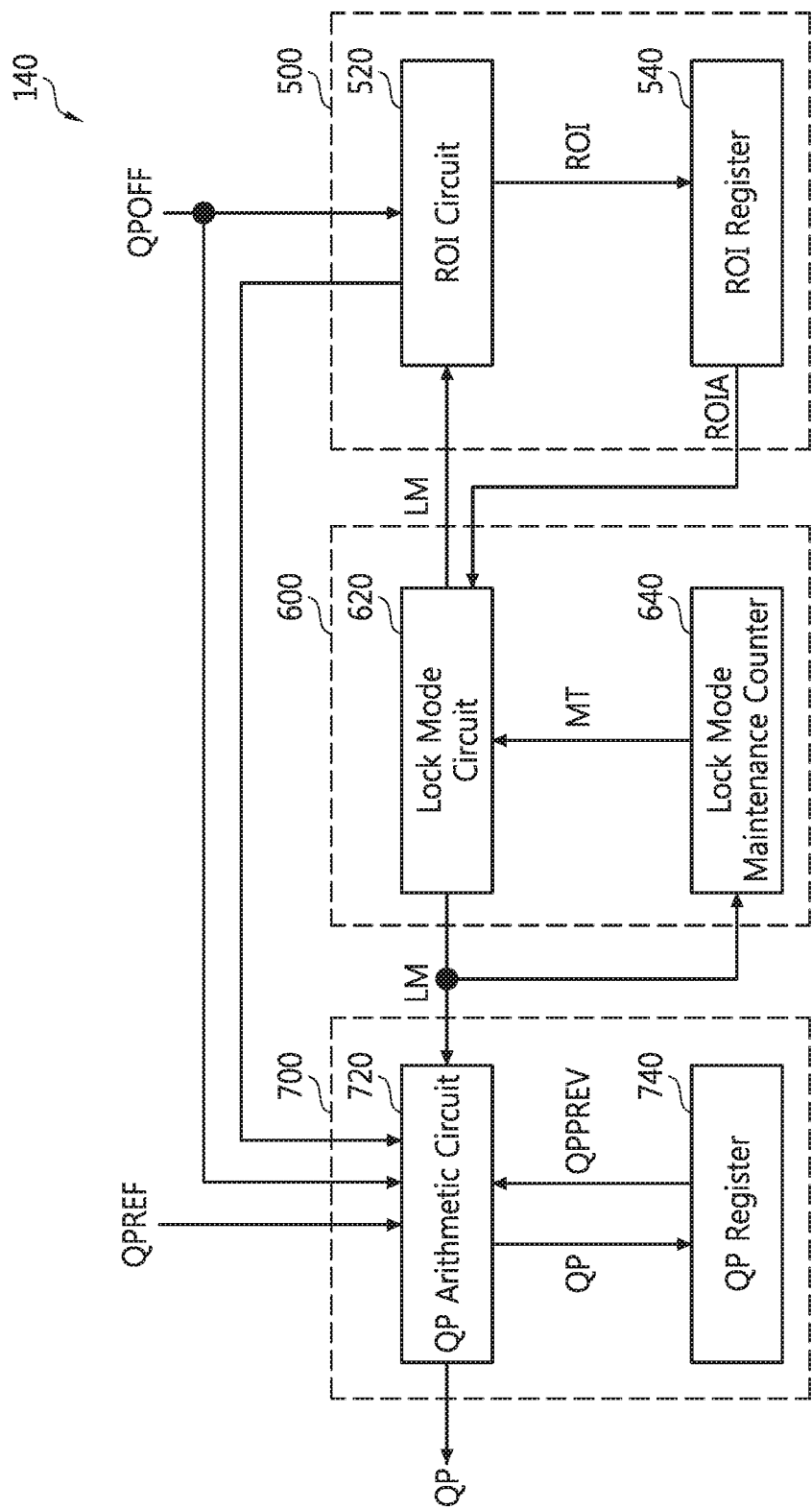
FIG. 5 is a block diagram of a false negative detection circuit shown in FIG. 1 according to an example embodiment.

FIG. 5 is a block diagram of the false negative detection circuit shown in FIG. 1.

Referring to FIG. 5, the false negative detection circuit 140 may include a region of interest (ROI) decision circuit 500, a lock mode decision circuit 600, and a quantization parameter (QP) decision circuit 700.

The ROI decision circuit 500 may include at least a ROI circuit 520 and a ROI register 540. The ROI circuit 520 may receive a quantization parameter offset QPOFF from the activity masking circuit 120 shown in FIG. 1, and receive lock mode information LM from the lock mode decision circuit 600.

The ROI circuit 520 may determine whether a current block corresponds to a region of interest according to the quantization parameter offset QPOFF and the lock mode information LM. The ROI circuit 520 may output region of interest information ROI corresponding to a result of the determination to the ROI register 520.

The region of interest information ROI may represent information on a region of interest R when the quantization parameter offset QPOFF is negative or the lock mode information LM is in a locked state. The region of interest information ROI may represent information on a region of non-interest X when the quantization parameter offset QPOFF is not negative and the lock mode information LM is in a normal state.

The ROI register 540 may receive region of interest information ROI of a current block from the ROI circuit 520 and store the region of interest information ROI.

The lock mode decision circuit 600 may include a lock mode circuit 620 and a lock mode maintenance counter 640. The lock mode circuit 620 may receive region of interest information ROIA of neighboring blocks of a current block from the ROI register 540, and receive a lock mode maintenance time MT from the lock mode maintenance counter 640.

The lock mode circuit 620 may determine lock mode information of a current block and lock mode information LM of at least one next block of the current block to be in a locked state when the region of interest information ROI of all of the neighboring blocks represents a region of interest. The lock mode maintenance counter 640 may receive the lock mode information LM from the lock mode circuit 620, and count the lock mode maintenance time MT.

When the region of interest information ROI of all of the neighboring blocks of the current block represents a region of interest, the lock mode information LM may be in a locked state L, and when the region of interest information ROI of any one of the neighboring blocks of the current block represents a region of non-interest, the lock mode information LM may represent that the lock mode information LM of the current block is in a normal state N.

The lock mode maintenance time MT may represent the number of blocks designated to be a region of interest. For example, when the lock mode maintenance time MT is three, region of interest information of three blocks including a current block all represents a region of interest. According to example embodiments, the initial lock mode maintenance time may be changed.

The lock mode maintenance counter 640 may change the lock mode maintenance time MT whenever a block on which image processing is performed is changed. For example, when an encoder performs image processing of a current block and the lock mode maintenance time MT is three, the lock mode maintenance time MT may be two or four when performing image processing on a next block of the current block.

When the lock mode maintenance counter 640 does not count the lock mode maintenance time MT, and the lock mode maintenance counter 640 receives the lock mode information LM, which represents that a current block is in a lock mode from the lock mode circuit 620, the lock mode maintenance counter 640 may reset the lock mode maintenance time MT to an initial lock mode maintenance time.

The lock mode maintenance counter 640 may stop the count when the lock mode maintenance time MT is the same as a limited lock mode maintenance time. According to an example embodiment, the limited lock mode maintenance time may be changed.

Referring to FIGS. 3 and 6, it is assumed that the initial lock mode maintenance time IMT is three, the limited lock mode maintenance time LMT is zero, and the lock mode maintenance time MT is subtracted by one whenever the block on which image processing is performed is changed.

When a $(2,2)^{th}$ block B(2,2) is a current block on which image processing is being performed, all of a $(1,1)^{th}$ block B(1,1), a $(1,2)^{th}$ block B(1,2), a $(1,3)^{th}$ block B(1,3), and a $(2,1)^{th}$ block B(2,1) are the region of interest R, such that the $(2,2)^{th}$ block B(2,2) may be in the lock mode L (STATE3).

In addition, since the lock mode maintenance counter 640 does not count the lock mode maintenance time MT, the lock mode maintenance time MT of the $(2,2)^{th}$ block B(2,2) may be the initial lock mode maintenance time (IMT=3) and region of interest information ROI(2,2) of the $(2,2)^{th}$ block B(2,2) may not represent the region of non-interest X, but may represent the region of interest R.

Since the lock mode maintenance time MT of a $(2,3)^{th}$ block B(2,3) is two and the lock mode maintenance time MT is not zero, the $(2,3)^{th}$ block B(2,3) may be in the lock mode L (STATE1), and region of interest information ROI(2,3) of the $(2,3)^{th}$ block B(2,3) may not represent the region of non-interest X, but represent the region of interest R.

Referring to FIG. 5, the quantization parameter decision circuit 700 may include a quantization parameter arithmetic circuit 720 and a quantization parameter register 740. The quantization parameter arithmetic circuit 720 may receive a quantization parameter QPPREV of an immediately previous block, a quantization parameter offset QPOFF of a current block, lock mode information LM, and a reference quantization parameter QPREF of the current block.

The immediately previous block herein may refer to a block on which image processing is performed immediately before image processing is performed on the current block. The quantization parameter arithmetic circuit 720 shown in FIG. 5 may determine a quantization parameter QP by changing a method according to the lock mode information LM.

Still referring to FIG. 5, the lock mode information LM represents the lock mode L, the quantization parameter decision circuit 700 may determine the quantization parameter QP of the current block according to Equation 3.

$$QP=\min(QPPREV,QPREF+QPOFF) \quad \text{[Equation 3]}$$

Here, QP may refer to a quantization parameter of a current block; QPPREV may refer to a quantization parameter of an immediately previous block; QPREF may refer to a reference quantization parameter of the current block; QPOFF may refer to a quantization parameter offset of the current block, and min(a,b) may refer to an output of a minimum value between a and b.

When the lock mode information LM represents the normal state N, the quantization parameter decision circuit 700 may determine the quantization parameter QP of the current block according to Equation 4.

$$QP=\text{clip}(QPMIN,QPMAX,QPREF+QPOFF) \quad \text{[Equation 4]}$$

Here, QP may refer to the quantization parameter of the current block; QPMIN may refer to a minimum reference quantization parameter; QPMAX may refer to an increase (and/or maximum) reference quantization parameter; QPREF may refer to a reference quantization parameter of the current block; and QPOFF may refer to a quantization parameter offset of the current block.

Clip(a,b,c) may refer to outputting a when c is less than a, outputting b when c is greater than b, and outputting c when c is greater than or equal to a and less than or equal to b.

In the present specification, the minimum reference quantization parameter QPMIN and the increased (and/or maximum) reference quantization parameter QPMAX are represented as fixed values; however, they are not limited thereto. That is, the quantization parameter arithmetic circuit 720 may receive the minimum reference quantization parameter QPMIN and the increased (and/or maximum) reference quantization parameter QPMAX according to example embodiments.

Still referring to FIG. 5, the quantization parameter register 740 may store the quantization parameter QP output by the quantization parameter arithmetic circuit 720.

FIGS. 7A to 7C and 8A to 8D represent steps of determining a quantization parameter of a plurality of blocks according to example embodiments of inventive concepts.

Referring to FIGS. 4 and 7A to 8D, since the average activity ACTPA of the previous frame is 100, it is assumed that strength is 3 (e.g., see D1 of FIG. 4), the minimum reference quantization parameter QPMIN is 1, the increased (and/or maximum) reference quantization parameter QPMAX is 51, the initial lock mode maintenance time IMT is 3, the limited lock mode maintenance time LMT is 0, the reference quantization parameter QPREF is the same as in FIG. 7A, and the activity ACT is the same as in FIG. 7B.

As shown in FIG. 7B, since each of an activity ACT(3,3) of a $(3,3)^{th}$ block, an activity ACT(3,4) of a $(3,4)^{th}$ block, an activity ACT(4,3) of a $(4,3)^{th}$ block, and an activity ACT(4, 4) of a $(4,4)^{th}$ block is greater than or equal to the average activity ACTPA of the previous frame, each of a quantization parameter offset QPOFF(3,3) of the $(3,3)^{th}$ block, a quantization parameter offset QPOFF(3,4) of the $(3,4)^{th}$ block, a quantization parameter offset QPOFF(4,3) of the $(4,3)^{th}$ block, and a quantization parameter offset QPOFF(4,4) of the $(4,4)^{th}$ block may be calculated using Equation 1, as shown in FIG. 7C.

As shown in FIG. 8A, since each of the quantization parameter offset QPOFF(3,3) of the $(3,3)^{th}$ block, the quantization parameter offset QPOFF(3,4) of the $(3,4)^{th}$ block, the quantization parameter QPOFF(4,3) of the $(4,3)^{th}$ block, and the quantization parameter offset QPOFF(4,4) of the $(4,4)^{th}$ block is not negative, but all of neighboring blocks B(2,2), B(2,3), B(2,4), and B(3,2) of the $(3,3)^{th}$ block B(3,3) are the region of interest R, the $(3,3)^{th}$ block B(3,3) may be in the lock mode L to be the region of interest R, and since the lock mode maintenance time MT is not 0, the $(3,4)^{th}$ block B(3,4) may be in the lock mode L to be the region of interest R.

According to FIGS. 8C and 8D, using Equation 4, a quantization parameter QP(4,3) of the $(4,3)^{th}$ block may be a sum value of a reference quantization parameter QPREF (4,3) of the (4,3)$^{th}$ block and the quantization parameter offset QPOFF(4,3) of the (4,3)$^{th}$ block, and a quantization parameter QP(4,4) of the (4,4)$^{th}$ block may be a sum value of a reference quantization parameter QPREF(4,4) of the (4,4)$^{th}$ block and the quantization parameter offset QPOFF (4,4) of the (4,4)$^{th}$ block.

However, a quantization parameter QP(3,3) of the (3,3)$^{th}$ block may be a smaller value (e.g., value of about 28) of (i) a quantization parameter QP(3,2) of an immediately previous block, and (ii) a sum of a reference quantization parameter QPREF(3,3) of the (3,3)$^{th}$ block and the quantization parameter offset QPOFF(3,3) of the (3,3)$^{th}$ block using Equation 3.

A quantization parameter QP(3,4) of the (3,4)$^{th}$ block may be a smaller value (e.g., value of about 28) of (iii) the quantization parameter QP(3,3) of the immediately previous block, and (iv) a sum of a reference quantization parameter QPREF(3,4) of the (3,4)$^{th}$ block and the quantization parameter offset QPOFF(3,4) of the (3,4)$^{th}$ block.

FIGS. 9A to 10D are drawings respectively representing steps of determining the quantization parameter of the plurality of blocks according to example embodiments of inventive concepts.

Referring to FIGS. 4 and 9A to 10D, since the average activity ACTPA of a previous frame is 200, it is assumed that strength is 6 (e.g., see D2 of FIG. 4), the minimum reference quantization parameter QPMIN is 1, the increased (and/or maximum) reference quantization parameter QPMAX is 51, the initial lock mode maintenance time IMT is 3, the limited lock mode maintenance time LMT is 0, the reference quantization parameter QPREF is the same as in FIG. 9A, and the activity ACT is the same as in FIG. 9B.

As shown in FIG. 9B, since each of the activity ACT(3,3) of the (3,3)$^{th}$ block, the activity ACT(3,4) of the (3,4)$^{th}$ block, the activity ACT(4,3) of the (4,3)$^{th}$ block, and the activity ACT(4,4) of the (4,4)$^{th}$ block is greater than or equal to the average activity ACTPA of the previous frame, each of the quantization parameter offset QPOFF(3,3) of the (3,3)$^{th}$ block, the quantization parameter offset QPOFF(3,4) of the (3,4)$^{th}$ block, the quantization parameter offset QPOFF(4,3) of the (4,3)$^{th}$ block, and the quantization parameter offset QPOFF(4,4) of the (4,4)$^{th}$ block may be calculated using Equation 1 as shown in FIG. 9C.

As shown in FIG. 10A, since each of the quantization parameter offset QPOFF(3,3) of the (3,3)$^{th}$ block, the quantization parameter offset QPOFF(3,4) of the (3,4)$^{th}$ block, the quantization parameter offset QPOFF(4,3) of the (4,3)$^{th}$ block, and the quantization parameter offset QPOFF(4,4) of the (4,4)$^{th}$ block is not negative, but all of neighboring blocks B(2,2), B(2,3), B(2,4) and B(3,2) of the (3,3)$^{th}$ block B(3,3) are the region of interest R, the (3,3)$^{th}$ block B(3,3) may be in the lock mode L to be the region of interest R, and the (3,4)$^{th}$ block B(3,4) may be in the lock mode L to be region of interest R since a lock mode maintenance time MT is not 0.

In addition, all of neighboring blocks B(3,2), B(3,3), B(3,4) and B(4,2) of the (4,3)$^{th}$ block B(4,3) are the region of interest R, the (4,3)$^{th}$ block B(4,3) may be in the lock mode L to be the region of interest R, and the (4,4)$^{th}$ block B(4,4) may be in the lock mode L to be the region of interest R since the lock mode maintenance time MT is not 0.

According to FIGS. 10C and 10D, using Equation 3, the quantization parameter QP(3,3) of the (3,3)$^{th}$ block may be smaller of (i) the quantization parameter QP(3,2) of an immediately previous block, and (ii) a sum of the reference quantization parameter QPREF(3,3) of the (3,3)$^{th}$ block and the quantization parameter offset QPOFF(3,3) of the (3,3)$^{th}$ block. The quantization parameter QP(3,4) of the (3,4)$^{th}$ block may be smaller of (i) the quantization parameter QP(3,3) of an immediately previous block and (ii) a sum of the reference quantization parameter QPREF(3,4) of the (3,4)$^{th}$ block and the quantization parameter offset QPOFF (3,4) of the (3,4)$^{th}$ block.

Moreover, the quantization parameter QP(4,3) of the (4,3)$^{th}$ block may be smaller of (i) the quantization parameter QP(4,2) of an immediately previous block and (ii) a sum of the reference quantization parameter QPREF(4,3) of the (4,3)$^{th}$ block and the quantization parameter offset QPOFF (4,3) of the (4,3)$^{th}$ block. The quantization parameter QP(4, 4) of the (4,4)$^{th}$ block may be smaller of (i) the quantization parameter QP(4,3) of an immediately previous block and (ii) a sum of the reference quantization parameter QPREF(4,4) of the (4,4)$^{th}$ block and the quantization parameter offset QPOFF(4,4) of the (4,4)$^{th}$ block.

Figure 11:
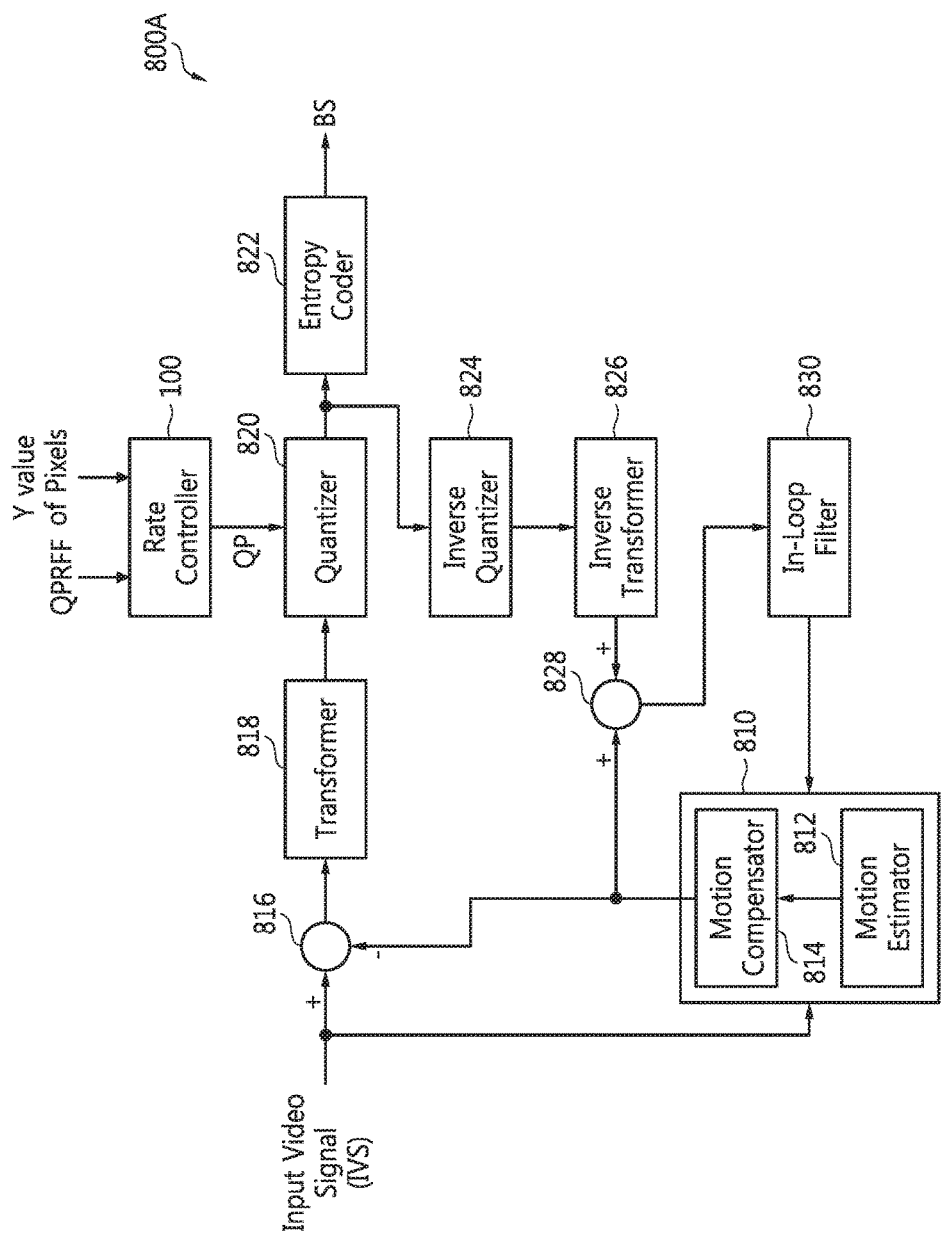
FIG. 11 is a block diagram of an encoder including the rate controller shown in FIG. 1 according to an example embodiment.

FIG. 11 is a block diagram of an encoder including the rate controller shown in FIG. 1.

Referring to FIGS. 1 and 11, an encoder 800A of FIG. 11 may include at least a predictor 810, a subtractor 816, a transformer 818, a quantizer 820, an entropy coder 822, an inverse quantizer 824, an inverse transformer 826, an adder 828, and an in-loop filter 830. The predictor 810 may include a motion estimator 812 and a motion compensator 814.

The predictor 810 may predict a current block, generate a predicted block, and output the predicted block. In particular, the predictor 810 may predict a pixel value of each of the pixels of a current block to be encoded, and generate a predicted block including the predicted pixel values. When performing inter-prediction, the predictor 810 may include the motion estimator 812 and the motion compensator 814. The motion estimator 812 may be referred to as a motion vector estimator.

The motion estimator 812 or the motion vector estimator 812 may estimate a motion vector of a current block on a block unit basis and determine a current motion vector according to a result of the estimation. The block unit basis corresponds to a block mode (or, a pre-set or desired block mode) of the current block, which refers to at least one reference picture. The block unit may be a 16*16 block, a 16*8 block, a 8*16 block, a 8*8 block, a 8*4 block, a 4*8 block, or a 4*4 block.

The motion compensator 814 may generate a predicted block of the current block using a current motion vector output from the motion vector estimator 812, and output the predicted block. That is, for example, the motion compensator 814 may output a block indicated by the current block as a predicted block in a reference picture.

The subtractor 816 may subtract a predicted block from a current block of image data input video signal (IVS) and generate a residual block. The subtractor 816 may calculate a difference between a pixel value of each of the pixels of the current block and a predicted value of each of the pixels of the predicted block outputted from the motion vector estimator 812, and generate the residual block having residual signals.

The rate controller 100 may receive a brightness value Y included in the residual blocks and a reference quantization parameter QPREF. The rate controller 100 may determine a quantization parameter QP through an activity masking operation performed in an activity masking circuit, and a false negative detection operation performed in a false negative detection circuit.

Still referring to FIG. 11, the transformer 818 may transform the residual signals of the residual block into a frequency domain. The quantizer 820 may quantize an output signal of the transformer 818 using the quantization parameter QP received from the rate controller 100, and output the quantized residual block. The transformer 818 may transform the residual signals into a frequency domain using a discrete cosine transform (DCT). The residual signals transformed into the frequency domain may be transformation coefficients.

The entropy coder 822 may encode the quantized residual block outputted from the quantizer 820, and output an encoded bit stream BS.

The inverse quantizer 824 may inversely quantize the quantized residual block outputted from the quantizer 820, and generate an inversely quantized residual block. The inverse transformer 826 may inversely transform the inversely quantized residual block, and generate a reconstructed residual block.

The adder 828 may reconstruct the current block by adding the predicted block outputted from the predictor 810 and the reconstructed residual block outputted from the inverse transformer 826 and.

The in-loop filter 830 may perform in-loop filtering on a reconstructed current block outputted from the adder 828, and output a result of the filtering to the predictor 810.

Figure 12:
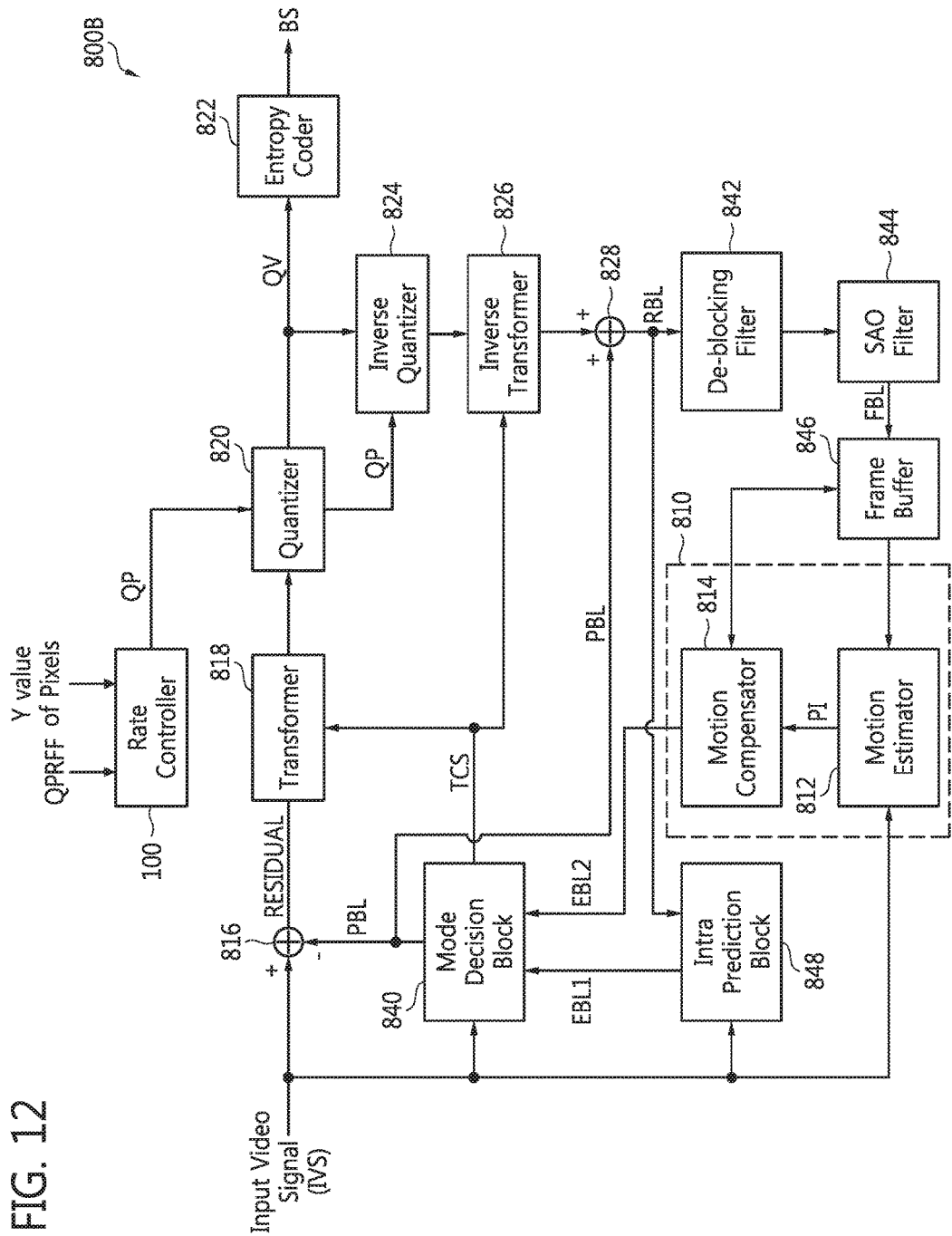
FIG. 12 is a block diagram of another encoder including the rate controller shown in FIG. 1.

FIG. 12 is a block diagram of another encoder including the rate controller shown in FIG. 1.

Referring to FIG. 12, an encoder 800B may include at least the predictor 810, the subtractor 816, the transformer 818, the quantizer 820, the entropy coder 822, the inverse quantizer 824, the inverse transformer 826, the adder 828, a mode decision block 840, a de-blocking filter 842, a sample adaptive offset (SAO) filter 844, a frame buffer 846, and an intra-predicted block 848.

The subtractor 816 may calculate differences between an input video signal (IVS) and values (hereinafter, referred to as "space-domain predicted block values") of a space-domain predicted block PBL outputted from the mode decision block 840. Furthermore, the subtractor 816 may generate values (hereinafter, referred to as "space-domain residual block values") of a space-domain residual block corresponding to a result of the calculation.

According to example embodiments, an input frame of the input video signal IVS may be a frame having a luminance chrominance YUV format, a frame having a luminance blue-difference and red-difference YCbCr format, or a frame having a red, green, blue (RGB) format; however, it is not limited thereto.

A block may include m*n pixels. Here, each of the m and n may be a natural number of two or more, and m may or may not be equal to n.

As described above, pixels may be data having the YUV format, data having the YCbCR format, or data having the RGB format; however, they are not limited thereto. For example, a block may include 16*16 pixels, 32*32 pixels, or 64*64 pixels; however, it is not limited thereto.

The subtractor 816 may calculate differences on a calculation block basis and output the result on a block basis. That is, for example, a size of the calculation block may be smaller than a size of the block. For example, when the calculation block includes 4*4 pixels, the block may include 16*16 pixels; however, it is not limited thereto.

The mode decision block 840 may receive the input video signal IVS, a first predicted block EBL1, and a second predicted block EBL2.

The mode decision block 840 may output one of the first predicted block EBL1 and the second predicted block EBL2 as the space-domain predicted block PBL.

In addition, the mode decision block 840 may determine whether not performing transformation on a space-domain residual block RESIDUAL is efficient, and generate a control signal TCS according to a result of the determination. The control signal TCS may be an instruction signal instructing whether to perform the transformation. That is, for example, the control signal TCS may be a flag having a first state or a second state; however, it is not limited thereto.

Still referring to FIG. 12, the rate controller 100 may receive the brightness value Y, included in the residual blocks, and the reference quantization parameter QPREF, and determine the quantization parameter QP through the (i) activity masking operation performed in the activity masking circuit, and (ii) the false negative detection operation performed in the false negative detection circuit.

The transformer 818 may skip or perform the transformation on a corresponding block according to a state of the control signal TCS. The transformer 818 may transform the residual signals of the residual block into a frequency domain.

As described above, when the control signal TCS is in a first state, the transformer 818 may calculate a representative value of the space-domain residual block values without performing a time domain-frequency domain transformation on the space-domain residual block RESIDUAL. A skip mode may be defined as when the control signal TCS is in the first state.

The quantizer 820 may quantize an output signal of the transformer 818 using the quantization parameter QP received from the rate controller 100, and output a quantized block QV.

When the control signal TCS is in a second state, the transformer 818 may perform a time domain-frequency domain transformation on the space-domain residual block RESIDUAL. The transformation may refer to a discrete cosine transform (DCT); however, it is not limited thereto.

The quantizer 820 may quantize the residual block transformed into the frequency-domain using the quantization parameter QP received from the rate controller 100, and generate the quantized block QV.

When the control signal TCS is in the second state, a process of calculating the representative value of the space-domain residual block values is not performed by the transformer 818 and/or the quantizer 820.

The entropy coder 822 encodes a quantized residual block outputted from the quantizer 820, and outputs an encoded bit stream BS.

The inverse quantizer 824 may inversely quantize the quantized residual block outputted from the quantizer 820 using the quantization parameter QP, and generates the inversely quantized residual block.

Still referring to FIG. 12, the inverse transformer 826 may skip or perform a transformation on a corresponding block according to a state of the control signal TCS. When the control signal TCS is in the first state, the inverse transformer 826 may inversely quantize the quantized block QV using an inverse quantization parameter and generate the inversely quantized block without performing an inverse transformation (for example, frequency domain-time domain transformation) on the quantized block QV.

When the control signal TCS is in the second state, the inverse transformer 826 may perform an inverse transformation (for example, frequency domain-time domain transformation) on the quantized block QV. The inverse transformation may refer to an inverse discrete cosine transform (IDCT); however, it is not limited thereto.

The adder 828 may generate a reconstructed block RBL by adding (i) the inversely quantized block (for example, a block not inversely transformed but inversely quantized) outputted from the inverse transformer 826 and (ii) the space-domain predicted block PBL outputted from the mode decision block 840. The reconstructed block RBL may be transmitted to the de-blocking filter 842 and the intra prediction block 848.

The adder 828 may generate a reconstructed block RBL by adding (i) the inversely quantized block (for example, a block inversely transformed and inversely quantized) outputted from the inverse transformer 826 and (ii) the space-domain predicted block PBL outputted from the mode decision block 840. The reconstructed block RBL may be transmitted to a de-blocking filter 241 and an intra prediction block 251.

The de-blocking filter 842 may perform a de-blocking operation on the block RBL reconstructed by the adder 828.

A sample adaptive offset (SAO) filter 844 performs a SAO filtering on a block de-blocked by the de-blocking filter 241.

The frame buffer 846 may receive and store the SAO filtered block output from the SAO filter 844. The frame buffer 846 may store a previous frame as a reference frame.

The predictor 810 may include at least a motion estimator 812 and a motion compensator 814.

Still referring to FIG. 12, the motion estimator 812 may receive the input video signal IVS and process a current frame on a block in a block unit referring to the previous frame stored in the frame buffer 846. That is, for example, the motion estimator 812 may transmit to the motion compensator 814 positional information PI on a block most matched with the input video signal IVS among previous blocks included in the previous frame stored in the frame buffer 846.

The motion compensator 814 may receive the positional information PI, read a block corresponding to the positional information PI from the frame buffer 846, and transmit a read block to the mode decision block 233 as the second predicted block EBL2. Accordingly, the second predicted block EBL2 may be a block predicted referring to the previous frame.

The intra prediction block 848 may receive the input video signal IVS and the reconstructed block RBL, and transmit a predicted block using the reconstructed block RBL to the mode decision block 840 as the first predicted block EBL1. Accordingly, the first predicted block EBL1 may be a predicted block using a block already encoded in the same frame.

The entropy coder 822 may encode a block QV quantized by the quantizer 820 and output an encoded bit stream BS.

Figure 13:
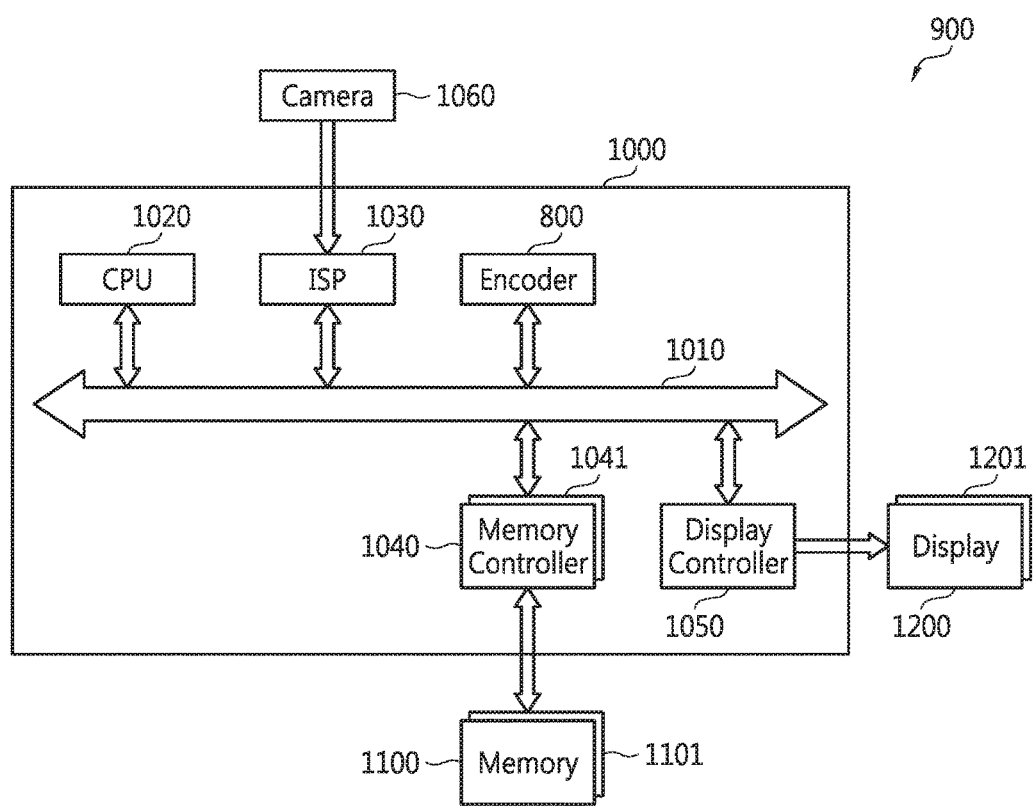
FIG. 13 is a block diagram of a data processing system including the encoder shown in FIG. 11 or the encoder shown in FIG. 12.

FIG. 13 is a block diagram of a data processing system including the encoder shown in FIG. 11 or the encoder shown in FIG. 12.

Referring to FIG. 13, a data processing system 900 may include at least a controller 1000, a camera 1060, at least one memory 1100 and/or 1101, and a display 1200. According to example embodiments, the data processing system 900 may further include a touch screen 1201.

The data processing system 900 may be embodied in including but not limited to, a personal computer (PC) or a mobile computing device. The mobile computing device may be embodied in including but not limited to, a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console a mobile internet device (MID), a wearable computer, an internet of things (IoT) device, an internet of everything (IoE) device, and/or an e-book.

The controller 1000 may refer to a device for controlling an operation of the camera 1060, at least one memory 1100 and/or 1101, and the display 1200. According to example embodiments, the controller 1000 may control an operation of a touch screen 1201.

The controller 1000 may be embodied in including but not limited to, an integrated circuit, a motherboard, a system on chip (SoC), an application processor (AP), and/or a mobile AP.

Still referring to FIG. 13, the controller 1000 may include a bus architecture 1010, a central processing unit (CPU) 1020, an image signal processor (ISP) 1030, an encoder 800A of FIG. 11 and/or 800B of FIG. 12 (collectively, 800), at least one memory controller 1040 and/or 1041, and a display controller 1050.

The bus architecture 1010 may be embodied in including but not limited to, an Advanced Microcontroller Bus Architecture (AMBA), an Advanced High-performance Bus (AHB), an Advanced Peripheral Bus (APB), an Advanced extensible Interface (AXI) or an Advanced System Bus (ASB); however, it is not limited thereto.

The CPU 1020 may control an operation of the image signal processor 1030, the encoder 800, the at least one memory controller 1040 and/or 1041, and/or the display controller 1050 through the bus architecture 1010.

The image signal processor 1030 may control a format transformation of image data outputted from the camera 1060, a noise reduction of the image data, and an image enhancement of the image.

That is, for example, the image signal processor 1030 may transform first data having a first format outputted from the camera 1060 into second data having a second format. The first format may refer to a Bayer format, and the second format may refer to the YUV format, the YCbCr format, or the RGB format. The camera 1060 may include a complementary metal-oxide semiconductor (CMOS) image sensor chip.

It is shown in a non-limiting example embodiment of FIG. 1 that the image signal processor (ISP) 1030 is embodied in the controller 1000, but the image signal processor 1030 may be placed in the controller 1000, and the camera 1060 and may be embodied in an independent chip according to non-limiting example embodiments. According to example embodiments, the image signal processor 1030 may be placed in the camera 1060. And, the CMOS image sensor chip and the image signal processor 1030 may be packaged in one package.

The encoder 800 of FIG. 13 may receive an input video signal and output an encoded bit stream BS through quantization/inverse quantization and transformation/inverse transformation operations. The encoder 800 may determine a quantization parameter appropriate for a block on which image processing is performed in the quantization/inverse quantization process, and perform the quantization/inverse quantization operation using the determined quantization parameter.

The encoder 800 may transmit the encoded bit stream BS to at least one memory 1100 and/or 1101 through at least one memory controller 1040 and/or 1041.

The encoder 800 according to an example embodiment of inventive concepts may be an encoder which supports a H.264 video compression standard as shown in FIG. 11, and may be an encoder which supports a High Efficiency Video Coding (HEVC) video compression standard as shown in FIG. 12; however, it is not limited thereto.

At least one memory controller 1040 and/or 1041 may read encoded image data (for example, encoded bit stream) from at least one memory 1100 and/or 1101. The encoded image data (for example, encoded bit stream) transmitted from the at least one memory controller 1040 and/or 1041 are decoded by a decoder (not shown), and the decoded image data may be transmitted to the display 1200 through the display controller 1050.

A codec may include the encoder 800 and the decoder; however, an operation of the encoder 800 included in the codec is described in example embodiments of inventive concepts. The encoder 800 may perform a function of a compressor and a de-compressor.

At least one memory controller 1040 and/or 1041 may control a data access operation of at least one memory 1100 and/or 1101 according to a control of the CPU 1020. The data access operation may include a write operation of writing data in the memory 1100 or 1101, and a read operation of reading data from the memory 1100 or 1101.

The at least one memory 1100 and/or 1101 may include a volatile memory and/or a non-volatile memory. The volatile memory may include but not limited to, a random access memory (RAM), a dynamic RAM (DRAM), a static RAM (SRAM), and/or a buffer memory.

The non-volatile memory may be embodied in a flash memory, a magnetic RAM (MRAM), a Spin-Transfer Torque MRAM, a ferroelectric RAM (FeRAM), a phase change RAM (PRAM), or a resistive RAM (RRAM).

The flash memory may be embodied in a NAND-type flash memory or a NOR-type flash memory for storing one or more bits.

That is, for example, the memory 1100 may be embodied in a DRAM, and the memory 1101 may be embodied in a flash-based memory. At this time, the memory controller 1040 may be embodied in a DRAM controller, and the memory 1041 may be embodied in a flash-based memory controller.

The flash-based memory may be embodied in a solid-state drive or solid-state disk (SSD), a multimedia card (MMC), an embedded MMC (eMMC), or a universal flash storage (EFS).

The display controller 1050 may transmit data outputted from the CPU 1020, the encoder 800, or the display controller 1050 to the display 1200 according to a control of the CPU 1020.

The camera 1060 may include at least a CMOS image sensor chip. The CMOS image sensor chip may output image data corresponding to an optical image of a subject to the image signal processor 1030. According to an example embodiment, the camera 1060 may output image data to the image signal processor 1030 through a Mobile Industry Processor Interface (MIPI) camera serial interface (CSI).

The display 1200 may display data output from the display controller 1050. The touch screen 1201 may be used to select or to activate a graphic user interface (GUI) to be displayed on the display 1200. That is, for example, the touch screen 1201 may generate a user touch input for controlling an operation of the controller 1000 and the user touch input may be supplied to the CPU 1020.

The GUI may be displayed on the display 1200 according to a control of an application program performed by the CPU 1020.

An encoder and an application processor according to example embodiments of inventive concepts can set a quantization parameter for an image corresponding to each of the blocks.

The rate controller 100, quantizer 820, predictor 810, mode decision block 840, intra prediction block 848, and controller 1000 are implemented using hardware components, a processor executing software components, or a combination thereof. Upon execution of one or more algorithms, described in example embodiments of inventive concepts, the aforementioned hardware components, or processor executing software components, result in a special purpose processor. Algorithms, as presented in example embodiments of inventive concepts, constitutes sufficient structure, that may comprise of, including but not limited to, mathematical formulas, flow charts, computer codes, and/or necessary steps, which upon execution result in a special purpose computer that is programmed to perform the disclosed algorithms in example embodiments of inventive concepts.

It should be understood that example embodiments of inventive concepts described herein should be considered in a descriptive sense only and not for the purposes of limitation. Descriptions of features or aspects within each device or method according to example embodiments should typically be considered as available for other similar features or aspects in other devices or methods according to example embodiments. While some example embodiments have been particularly shown and described, it will be appreciated by those skilled in the art that changes and/or variations may be made in these example embodiments without departing from the spirit and scope of which is defined in the appended claims and their equivalents.

What is claimed is:

1. An encoder comprising: a rate controller configured to cause the encoder to, determine a quantization parameter offset based on an activity of a current block and an average activity of a previous frame, determine lock mode information of the current block, the lock mode information being associated with whether neighboring blocks of the current block belongs to a region of interest, determine a quantization parameter using the quantization parameter offset and the lock mode information, and determine whether the current block belongs to the region of interest based on at least one of (i) the quantization parameter offset or (ii) the lock mode information; and a quantizer configured to quantize the current block using the quantization parameter, wherein the lock mode information is in one of a locked state and a normal state, the lock mode information being in the locked state when each neighboring block of the current block belongs to the region of interest, the lock mode information being in the normal state when any one neighboring block of the current block belongs to a region of non-interest.

2. The encoder of claim 1, wherein the rate controller is further configured to cause the encoder to, calculate brightness values in sub-blocks of the current block, calculate variance values of the brightness values in the sub-blocks, and determine a smallest variance value of the variance values as the activity of the current block.

3. The encoder of claim 2, wherein the rate controller comprises:

a strength decision circuit configured to calculate a strength using the average activity of the previous frame; and an offset arithmetic circuit configured to determine the quantization parameter offset using (i) the activity of the current block, (ii) the average activity of the previous frame, and (iii) the strength.

4. The encoder of claim 3, wherein the offset arithmetic circuit is configured to,
generate the quantization parameter offset to have a positive offset if the activity of the current block is greater than the average activity of the previous frame, and
generate the quantization parameter offset to have a negative offset if the activity of the current block is less than or equal to the average activity of the previous frame.

5. The encoder of claim 1, wherein the rate controller is further configured to cause the encoder to,
determine the current block as belonging to the region of interest if the lock mode information is in a locked state.

6. The encoder of claim 5, wherein the quantization parameter is a quantization parameter of the current block and the rate controller further comprises:
a quantization parameter decision circuit configured to determine the quantization parameter of the current block if the lock mode information of the current block is in the locked state, as:

QP=Min(QPPREV, QPREF+QPOFF), where, QPPREV is a quantization parameter of a previous neighboring block of the current block, QPREF is a reference quantization parameter of the current block, and QPOFF is the quantization parameter offset.

7. The encoder of claim 1, wherein the rate controller is further configured to cause the encoder to,
determine the current block and at least one next block of the current block as belonging to the region of interest if the lock mode information is in a locked state.

8. The encoder of claim 1, wherein the rate controller is further configured to cause the encoder to,
determine the current block as a region of non-interest if (i)the quantization parameter offset is positive and (ii) the lock mode information is in a normal state.

9. The encoder of claim 1, wherein the rate controller further comprises:
a quantization parameter decision circuit configured to determine the quantization parameter if the lock mode information is in a normal state, as:

QP=clip(QPMIN, QPMAX, QPREF+QPOFF), where, QPMIN is a minimum reference quantization parameter, QPMAX is a maximum reference quantization parameter, QPREF is a reference quantization parameter, and QPOFF is the quantization parameter offset.

10. An application processor comprising: an image signal processor configured to output a previous frame and a current frame; an encoder connected to the image signal processor, the encoder including, a rate controller configured to cause the encoder to, determine a quantization parameter offset based on an activity of a current block and an average activity of the previous frame, determine lock mode information of the current block, determine a quantization parameter using the quantization parameter offset and the lock mode information, and determine whether the current block belongs to a region of interest based on at least one of (i) the quantization parameter offset, or(ii) the lock mode information; and a quantizer configured to quantize a block using the quantization parameter,
wherein the lock mode information is in one of a locked state and a normal state, the lock mode information being in the locked state when each neighboring block of the current block belongs to the region of interest, the lock mode information being in the normal state when any one neighboring block of the current block belongs to a region of non-interest.

11. The application processor of claim 10, wherein the rate controller is further configured to cause the encoder to,
calculate brightness values in sub-blocks of the current block,
calculate variance values of the brightness values in the sub-blocks, and
determine a smallest variance value of the variance values as the activity of the current block.

12. The application processor of claim 11, wherein the rate controller comprises:
a strength decision circuit configured to calculate a strength using the average activity of the previous frame; and
an offset arithmetic circuit configured to determine the quantization parameter offset using (i) the activity of the current block, (ii) the average activity of the previous frame, and (iii) the strength.

13. An encoder comprising:
a rate controller configured to generate a quantization parameter based on a quantization parameter offset and lock mode information, wherein
the quantization parameter offset is based on (i) an activity signal of a current block, (ii) an average activity of a previous frame, and (iii) a strength signal corresponding to the average activity of the previous frame, and
the lock mode information is in one of a locked state and a normal state, the locked state corresponding to the current block when each neighboring block of the current block belongs to a region of interest, the normal state corresponding to the current block when any one neighboring block of the current block belongs to a region of non-interest; and
an entropy coder configured to generate an encoded bit stream based on the quantization parameter.

14. The encoder of claim 13, wherein the rate controller comprises:
a region of interest decision circuit configured to,
receive the quantization parameter offset and the lock mode information,
determine whether the current block corresponds to the region of interest based on the quantization parameter offset and the lock mode information,
generate region of interest information of the current block based on the determination, and
store the region of interest information of the current block.

15. The encoder of claim 14, wherein the region of interest decision circuit is further configured to,
generate the region of interest information of the current block, such that the region of interest information of the current block represents (i) the region of interest if the quantization parameter offset is negative or the lock mode information is in the locked state, or (ii) the region of non-interest if the quantization parameter is not negative and the lock mode information is in the normal state.

16. The encoder of claim 13, wherein the rate controller comprises:
an offset decision circuit configured to,
store the average activity of the previous frame based on an average activity of a previous block, the average activity of the previous block corresponds to dividing a result value by a number of blocks included in the previous frame, the result value based on variance values of brightness values in sub-blocks of the previous block.

17. The encoder of claim 13, wherein the rate controller is further configured to,
generate the quantization parameter offset to have a positive offset if a magnitude of the activity signal of the current block is greater than the average activity of the previous frame, and
generate the quantization parameter offset to have a negative offset if the magnitude of the activity signal of the current block is less than or equal to the average activity of the previous frame.

18. The encoder of claim 1, wherein the rate controller is further configured to cause the encoder to,
determine the current block as belonging to the region of interest if the quantization parameter offset is negative.

* * * * *